Н
3,032,539
Patented May 1, 1962

3,032,539
COPOLYMERS OF A BIS ETHYLENICALLY
UNSATURATED AMINE
Walter H. Schuller, Stamford, Conn., and John A. Price, Swarthmore, Pa., assignors to American Cyanamid Company, New York, N.Y., a corporation of Maine
No Drawing. Filed Sept. 27, 1956, Ser. No. 612,371
8 Claims. (Cl. 260—85.5)

This invention relates broadly to new and useful copolymer compositions, and more particularly to compositions comprising a linear copolymer produced by polymerization of a mixture of copolymerizable ingredients including essentially a bis ethylenically unsaturated compound containing two and only two unsaturated groupings each having a terminal $CH_2=C<$ radical. Our invention is especially directed to such compositions comprising a linear copolymer obtained by polymerization of a mixture of copolymerizable ingredients including (1) a bis ethylenically unsaturated compound represented by the general formula I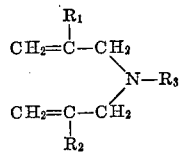

where $R_1$ and $R_2$ each represents a member of the class consisting of hydrogen and the methyl radical, and $R_3$ represents a member of the class consisting of hydrogen, saturated aliphatic (including aromatic-substituted saturated aliphatic) hydrocarbon radicals and aromatic (including saturated aliphatic-substituted aromatic) hydrocarbon radicals, and (2) a monoethylenically unsaturated compound which is copolymerizable with the compound of (1) and which contains a single $CH_2=C<$ grouping. The ingredients of (1) and (2) are present in the aforementioned mixture in the ratio of from about 0.1 to about 40 molar percent of the former to from about 99.9 to about 60 molar percent of the latter. The scope of the invention also includes method features, as well as products comprising an oriented fiber made from certain of the copolymers.

Illustrative examples of radicals represented by $R_3$ in Formula I are saturated aliphatic (including saturated cycloaliphatic), e.g., methyl, ethyl, propyl to octadecyl, inclusive, including the various isomeric forms, cyclopentyl, cyclohexyl, cycloheptyl, etc.; aromatic-substituted saturated aliphatic, e.g., benzyl, phenylethyl, phenylpropyl, etc.; aromatic, e.g., phenyl, biphenylyl or xenyl, naphthyl, etc.; and saturated aliphatic-substituted aromatic, e.g., tolyl, xylyl, ethylphenyl, tert.-butylphenyl, etc.

Specific examples of compounds embraced by Formula I are:

Diallylamine
Dimethallylamine
Diallylmethylamine
Diallylcyclohexylamine
Dimethallylethylamine
Diallylphenylamine
Diallylbenzylamine
Diallyltolylamine
Dimethallylphenylamine
Dimethallylbenzylamine
Dimethallyltolylamine
Dimethallylcyclohexylamine Other examples will be apparent to those skilled in the art from Formula I and from the illustrative examples of radicals represented by $R_3$.

Bis ethylenically unsaturated compounds represented by Formula I are broadly old, and many (if not all) of the individual species are known. They are readily prepared by conventional methods. Thus, a suitable method of preparing a diallylarylamine, specifically diallylphenylamine, is as follows:

A three-necked container equipped with a stirrer, reflux condenser, thermometer and dropping funnel comprises a suitable reaction vessel. One (1) mole of aniline is dissolved in sufficient benzene, previously charged to the vessel, to give a 20% solids solution. To this solution is added 2 moles of allyl bromide dropwise with stirring, and the temperature is maintained at reflux throughout the addition. After the addition of the allyl bromide has been completed, the mixture is heated under reflux at the boiling temperature of the mass for an additional 2 hours. The reaction mass is then stripped of benzene under moderately reduced pressure (e.g., with the aid of a water pump), after which the diallylphenylamine is isolated by distillation in vacuo. In a similar manner other bis ethylenically unsaturated compounds of the kind embraced by Formula I can be prepared by reaction between 1 mole of the appropriate primary amine and 2 moles of allyl or methallyl bromide.

It was known prior to our invention that monoallyl amine could be copolymerized with particular proportions of acrylonitrile and with mixtures of comonomers including acrylonitrile to yield a fiber-forming (fiber-formable) copolymer (see, for example, U.S. Patent No. 2,626,946 dated January 27, 1953). It was also known prior to our invention that various diallyl compounds, more particularly diallyl esters of certain polycarboxylic acids (specifically fumaric, sebacic, succinic, adipic and phthalic), could be polymerized to a solid, insoluble and infusible or cross-linked state (see, for example, U.S. Patent No. 2,311,327 dated February 16, 1943). However, to the best of our knowledge and belief it was not known or suggested prior to our invention that linear copolymers having particular and characteristic properties that make them especially valuable for use in industry could be produced by copolymerizing critical molar proportions of diallylamine, diallylmethylamine, or other compound (or mixture of compounds) of the kind embraced by Formula I, with at least one compound which is different therefrom, is copolymerizable therewith and which contains a single $CH_2=C<$ grouping, e.g., styrene, nuclearly substituted monomethyl and dimethyl styrenes, methyl and other lower alkyl acrylates, acrylamide, acrylonitrile, methacrylonitrile, vinyl acetate, etc.

We prefer to use as the comonomer with the bis ethylenically unsaturated compound a compound which is copolymerizable therewith and which is represented by the general formula II 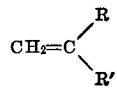

where R represents a member of the class consisting of hydrogen, and alkyl, aryl, alkaryl and aralkyl radicals, and R' represents a radical of the class consisting of aryl and alkaryl radicals and radicals represented by the formulas (a)         $-C\equiv N$ (b)

(c)

(d)

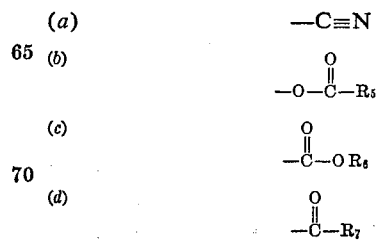

(e) 

(f) $-OR_{10}$ where $R_5$ and $R_6$ each represents an alkyl radical, $R_7$ represents a radical selected from the class consisting of alkyl and aryl radicals, $R_8$ and $R_9$ each represents a member of the class consisting of hydrogen, and alkyl, aryl, alkaryl and aralkyl radicals, and $R_{10}$ represents an alkyl radical.

The present invention is based on our discovery that compositions comprising new and useful linear copolymers can be produced by polymerization of a mixture of particular molar proportions of a bis ethylenically unsaturated compound of the kind embraced by Formula I and a monoethylenically unsaturated compound which is copolymerizable with the aforementioned bis compound and which contains a single $CH_2=C<$ grouping. The comonomer which is copolymerizable with the bis ethylenically unsaturated compound is preferably one which is represented by Formula II. The molar percentages of the aforesaid bis compound and comonomer which is copolymerized therewith may be considerably varied within the range of from about 0.1 to about 40 molar percent, e.g., from 0.5-2 to 20-30 molar percent, of the compound embraced by Formula I (specific examples of which have been given hereinbefore) to from about 99.9 to about 60 molar percent of the comonomer containing a single $CH_2=C<$ grouping, e.g., from 98-99.5 to 70-80 molar percent of the said $CH_2=C<$ compound. The copolymerization reaction may be carried out in any suitable manner, but preferably is effected while the mixture of copolymerizable ingredients is dissolved or dispersed in an aqueous medium and with the aid of a polymerization catalyst, after which the linear copolymer that is formed is isolated, if desired, from the aqueous mass; or, in those cases where the copolymer is formed in solution, the solution of the copolymer in certain cases may be used directly as such without isolation of the copolymer from the aqueous mass.

It was quite surprising and unexpected that a bis ethylenically unsaturated compound containing two unsaturated groupings having a terminal $CH_2=C<$ radical, that is, a compound embraced by Formula I, could be copolymerized with another compound containing a single $CH_2=C<$ grouping to yield a linear copolymer, since ordinarily it would be expected that such a bis compound when copolymerized with a compound containing a single $CH_2=C<$ grouping would yield a cross-linked copolymer. The reason for this mono-functionality of a bis ethylenically unsaturated compound of the kind used in practicing this invention is not fully understood.

Surprisingly, it was also discovered that the presence of the second ethylenically unsaturated grouping (allyl or methallyl radical) on the nitrogen atom apparently increases the susceptibility of the first ethylenically unsaturated grouping to copolymerization with a compound containing a single $CH_2=C<$ grouping.

The properties of the copolymers obtained by practicing our invention are quite unusual and in no way could have been predicted from the properties of the monomers employed in their preparation or from knowledge of the properties of simple homopolymers produced from the individual monomers. As a result, the characteristic properties of our new linear copolymers make them eminently suitable for use in industry in applications where the simple homopolymers thereof, as well as other types of copolymers, would be entirely unsuited. For example, the copolymers of a minor molar percentage of a bis ethylenically unsaturated compound of the kind embraced by Formula I and a major molar percentage of acrylonitrile (e.g., at least 80 mole percent of combined acrylonitrile) yield a fiber-forming linear copolymer which is more receptive to dyes, especially acid dyes, than the homopolymer of acrylonitrile and many of the fiber-forming copolymers of acrylonitrile. Thus, one can make products comprising an oriented fiber comprised of a linear copolymer obtained by polymerization of a mixture of copolymerizable ingredients including (1) a bis ethylenically unsaturated compound of the kind embraced by Formula I, e.g., diallylamine, diallylmethylamine, etc., and (2) acrylonitrile, the ingredients of (1) and (2) being present in the aforementioned mixture in the ratio of from 2 to 20 (e.g., from 5 to 15) molar percent of the former to from 98 to 80 (e.g., from 95 to 85) molar percent of the latter.

Copolymers of acrylamide and bis ethylenically unsaturated compounds of the kind used in practicing our invention also have very valuable properties. For example, such copolymers can be used as textile-treating agents, e.g., in rendering wool-containing fabrics resistant to felting and shrinking, as core binders, in adhesive and laminating compositions, as thickening agents, in the photographic arts and for many other purposes.

The linear copolymers of this invention also may be used as intermediates in the preparation of other synthetic compositions. For example, the acrylamide copolymers having at least one hydrogen atom attached to the amino nitrogen atom can be reacted with an aldehyde, e.g., formaldehyde, to yield a new class of thermosetting or potentially thermosetting resinous compositions. Or, thermosetting or potentially thermosetting compositions also may be produced from any of the linear copolymers of our invention by cross-linking the linear copolymer through the residual allyl (or methallyl grouping), for instance, by copolymerization with a suitable cross-linking agent, e.g., diallyl phthalate; any of the known polymerizable unsaturated alkyd resins containing a plurality of alpha, beta-enal groups; etc. Such a copolymerization with a cross-linking agent advantageously is effected at an elevated temperature and with the aid of a polymerization catalyst.

Polymerization catalysts which are suitable for use in polymerizing compounds containing an ethylenically unsaturated grouping, specifically a vinyl grouping, are usually suitable for use in producing the new linear copolymers of the present invention. Catalysts which are especially suitable for use in practicing this invention are the water-soluble peroxy catalysts, preferably a water-soluble salt of persulfuric (perdisulfuric) acid, which salt is preferably used in combination with a sulfoxy type of reducing agent. Other examples of polymerization catalysts which are useful in practicing the present invention include the inorganic and organic peroxides, e.g., the diacyl peroxides, the primary, secondary and tertiary alkyl peroxides and hydroperoxides and esters thereof, the various water-soluble peracetates, perchlorates, percarbonates, perborates, perphosphates, e.g., the ammonium and alkali-metal salts of peracetic, percarbonic, perboric, perphosphoric, persulfuric, perchloric, etc., acids; and water-soluble ferric salts capable of yielding ferric ions, including the various ferric alums, e.g., ferric ammonium sulfate, ferric sodium sulfate, etc.

Such water-soluble catalysts as mentioned above by way of example are generally employed in combination with a water-soluble activator of the catalyst, for instance, oxygen-containing, sulfur-containing compounds that are capable of undergoing oxidation. Illustrative examples of such activators or adjuvants include sulfur dioxide, the alkali-metal (e.g., sodium, potassium, etc.) bisulfites, hydrosulfites, thiosulfates, sulfurous acid (or compounds which engender sulfurous acid, e.g., alkali-metal sulfites, ethyl and other alkyl sulfites, etc.), various organic sulfinic acids, e.g., p-toluene sulfinic acid, formamidine sulfinic acid, etc. If alkali-metal sulfites, e.g., sodium sulfite, or similar compounds which engender sulfurous acid are used, the aqueous solution also should contain a strong acid, e.g., sulfuric acid, etc., in an amount which is at least chemically equivalent to the amount of such a compound engendering sulfurous acid that is employed.

Various other "free radical" types of catalysts can be used to accelerate polymerization, e.g., alpha, alpha'-azo-diisobutyronitrile. Illustrative examples of other catalysts that can be employed are given in, for instance, U.S. Patent No. 2,656,339.

The concentration of the catalyst is relatively small, e.g., from, by weight, about 1 part of catalyst per 1000 parts of the monomeric mixture to about 4 or 5 parts of catalyst per 100 parts of the mixture of monomers. The amount of polymerization adjuvant or activator used likewise may be varied considerably, but generally is within the range of from about 0.1 to 1 molar proportion based on the catalyst used or an amount which is chemically equivalent to the amount of catalyst employed. The use of higher ratios of activator with respect to the catalyst is not precluded, e.g., 2 or 3 or more moles of activator per mole of catalyst, or correspondingly larger proportions on a chemical equivalent basis, but no particular advantages ordinarily accrue therefrom.

The mixture of monomers can be polymerized in emulsion or solution state to yield a linear copolymer. Good results are obtained by effecting copolymerization while the monomers are dissolved in a suitable solvent, preferably water or liquid solvent comprising mainly water. Suitable inert organic solvents also can be used advantageously in some cases, e.g., benzene, toluene, xylene, various ketones, etc. The polymerization reaction advantageously is conducted under a blanket of an inert gas, e.g., nitrogen gas.

The temperature at which the monomers are copolymerized can be considerably varied, but in most cases the polymerization temperature will be within the range of about 20°–30° C., preferably at least 35° or 40° C., up to the boiling temperature of the mixture of monomers, depending, for example, upon the particular catalyst, if any, used, the rapidity of polymerization wanted and other influencing factors.

The polymerization can be carried out continuously, semi-continuously or by batch operations. It can be effected under superatmospheric pressure if desired or required.

In order that those skilled in the art may better understand how the present invention can be carried into effect, the following examples are given by way of illustration and not by way of limitation. In all cases the parts and percentages are by weight unless otherwise stated.

EXAMPLE 1

*Copolymer of Acrylamide and Diallylamine*

A 3-necked reaction vessel is equipped with a thermometer, mechanical stirrer, gas-inlet tube, reflux condenser, and three dropping funnels, which are hereinafter designated for convenience as "A," "B" and "C." The vessel is charged with a solution of 50 g. (about 3.75 mole percent) of diallylamine in 500 ml. of water, the solution is adjusted to pH 2 with 6 N sulfuric acid, and the mixture is swept with nitrogen for 20 minutes. Funnel A is charged with a solution containing 900 g. (about 92.5 mole percent) of acrylamide and 50 g. (about 3.75 mole percent) of diallylamine dissolved in 2500 ml. of water. This solution is adjusted to pH 2 with 6 N sulfuric acid. Funnel B is charged with a solution containing 2 g. of ammonium persulfate dissolved in 500 ml. of water. Funnel C is charged with a solution containing 1 g. of potassium meta-bisulfite dissolved in 500 ml. of water. The contents of the dropping funnels are added portionwise, in constant proportion to one another, over a 30-minute period at 40° C. while stirring. The reaction mass is heated for 3 hours at the same temperature (40° C.). A steady flow of nitrogen gas is kept running through the reaction set-up during the polymerization. The resulting viscous solution of linear copolymer of acrylamide and diallylamine is diluted by adding 10,000 ml. of water, accompanied by vigorous stirring, to yield a solution containing 10% copolymer solids.

As the product is a free-flowing solution and contains no cross-linked material visible to the naked eye, the composition of the copolymer properly may be considered to be essentially the same as the charge composition.

To 80 g. of the above 10% solids solution of the acrylamide-diallylamine linear copolymer is added 80 g. of water, and the resulting solution is adjusted to pH 10 by the addition of a few drops of 2.3 N sodium hydroxide. To this solution is added 10.5 g. of formalin (approximately 37% aqueous formaldehyde solution), previously adjusted to pH 10, and the resulting mixture is heated for 1 hour at 50° C., after which hydrochloric acid is added in an amount sufficient to lower the pH to 7.

A piece of woolen goods is immersed in the above solution. The treated wool is passed through squeeze rolls, after which it is framed, air-dried for a short period, and then heated for 9 minutes at 290° F. After cooling to room temperature, the sample is removed from the frame, allowed to remain undisturbed for about 16 hours, and is then measured prior to laundering. The method of laundering is a modification of the standard method of the A.A.T.C.C., and involves heating for 20–30 minutes at 240° F. while drying after each washing. After a cycle of 5 washing (10 minutes in soap solution) and drying operations, the dried, treated cloth shows a shrinkage of only 5.3%. After 5 cycles of washing and drying operations and a washing of 1 hour in soap solution after each cycle, the dried, treated cloth shows a shrinkage of only 8.4%. In marked contrast, untreated woolen cloth after 5 washing cycles of 10 minutes each followed by 60 minutes' washing shows a shrinkage of 45%.

EXAMPLE 2

*Copolymer of Acrylamide and Diallylmethylamine*

The apparatus used and procedure followed are, in general, the same as that described in Example 1 with the exception that the reaction vessel is provided with a fourth dropping funnel, "D." The polymerization vessel is charged with 30 g. (about 10.1 mole percent) of diallylmethylamine and 720 g. of water, and the solution is adjusted to pH 2.5 by the addition of 5 N sulfuric acid. Funnel A is charged with 170 g. of acrylamide (about 89.9 mole percent) dissolved in 580 g. of water. Funnel B is charged with 2 g. of ammonium persulfate dissolved in 250 g. of water. Funnel C is charged with 1 g. of potassium meta-bisulfite in 250 g. of water. Funnel D is charged with 50 ml. of isopropanol. The reaction vessel is purged with nitrogen for one hour, with stirring. The contents of the four funnels are added in five equal portions with a 20-minute interval between each addition. Stirring is maintained continuously as is a continual, slow flow of nitrogen into the vessel. The temperature is held at 40° C. throughout the 80-minute addition period, and the subsequent heating period of 2⅔ hours. The Brookfield viscosity of the resulting 12.3% solids solution (foil method) is 1,600 cps. The iodine number is 5.8 cg. $I_2$/g. of solution.

In a manner similar to that described above, other copolymers are prepared from other proportions of acrylamide and diallylmethylamine. More specific information follows:

| Weight Percent of Monomer Charged | | Percent Solids in Aqueous Solution | Brookfield Viscosity, cps. | Iodine No. cg.$I_2$/g. Solution |
|---|---|---|---|---|
| Acrylamide | Diallylmethylamine | | | |
| 75 | 25 | 10.0 | 150 | ------ |
| 75 | 25 | 11.4 | 740 | 10.2 |
| 95 | 5 | 11.8 | 6,880 | 2.4 |

The aqueous copolymer solutions of this example, or solutions of their formaldehyde-reaction products, are useful as, for instance, core binders, components of adhesive and laminating compositions, sealing agents, thickeners, etc. They are also useful as textile-treating compositions or as components of such compositions. For instance, they can be employed in treating wool-containing fabrics and other textiles to impart shrinkage resistance thereto as described under Example 1 with reference to the formaldehyde-reaction product of that example; or, solutions of formaldehyde-reaction products of the copolymer can be used in this same manner.

For the acrylamide used in Examples 1 and 2, one can substitute an equivalent amount of another monomer (or mixture of monomers in any proportions) which is different from diallylamine (or diallylmethylamine), is copolymerizable therewith and which contains a

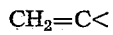

grouping, more particularly a compound (or mixture of compounds) of the kind embraced by Formula II, e.g., methacrylamide, ethacrylamide, cyclopentylacrylamide, phenylacrylamide, tolylacrylamide, benzylacrylamide, and the various mono- and di-N-substituted acrylamides, including the mono- and di-N-alkyl, -cycloalkyl, -aryl, alkaryl, -aralkyl and -alkoxyalkyl acrylamides. In some cases it may be desirable to carry out the reaction in a mixture of water and an organic solvent, for instance a 1:1 volume mixture of water and acetone when preparing a copolymer of diallylamine (or diallylmethylamine) and, for example, N-tertiary-butylacrylamide.

For the diallylamine of Example 1 or the diallylmethylamine of Example 2, one can substitute an equivalent amount of the corresponding dimethallylamines or any other compound of the kind embraced by Formula I, numerous examples of which have been given hereinbefore.

EXAMPLE 3

Copolymer of Acrylonitrile and Diallylamine

The apparatus used is essentially the same as that described in Example 1 with the exception that only two dropping funnels are employed. To the vessel is added 98.5 g. of 96.9% acrylonitrile (about 96.6 mole percent), 6.1 g. of diallylamine (about 3.4 mode percent), and 800 g. of water. The solution is adjusted to pH 2 by the addition of 5.0 ml. of 3 N $HNO_3$, and then 140 g. of water is added. To the first funnel is added a solution of 0.44 g. of sodium chlorate and 3.15 g. of disodium sulfite heptahydrate dissolved in 100 g. of water. To the second funnel is added 6.2 ml. of 3 N $HNO_3$ and 94 ml. of water. As usual, the reaction set-up is swept with a stream of nitrogen for 30 minutes prior to the start of the copolymerization, and the reaction is carried out under a nitrogen stream. The constant-temperature bath is set at 40° C. A 40-ml. addition is made from each funnel during vigorous stirring. After a few minutes, a white solid is observed precipitating from solution. The remainder of each of the solutions in the dropping funnels is added in six portions over a 2½-hour period, followed by a 2-hour heating period at 40° C. The linear copolymer of acrylonitrile and diallylamine that forms is filtered from the reaction mass, washed with 2 liters of water, and dried at 70° C. The dried copolymer weighs 71 g. (about 70% conversion).

One-half gram of dried copolymer is dissolved in 50 ml. of dimethylformamide to yield a perfectly clear solution without any indication of insoluble gel being present. This would indicate a lack of cross-linked material in the copolymer. A sample of the dried copolymer weighing approximately 1 g. is dispersed in a mixture containing 10 ml. of a 10% solution of sodium sulfate, 10 ml. of a 2% aqueous solution of sulfuric acid, 10 ml. of a 2% aqueous solution of Calcocid Alizarine Blue SAPG (Color Index No. 1054), and 90 ml. of water. The dispersion is boiled for 40 minutes, then filtered by suction, and the solid is washed with hot water until the filtrate is colorless. The copolymer is found to be dyed a deep blue, indicating that a substantial quantity of diallylamine has been incorporated in the copolymer. Homopolymeric acrylonitrile, when similarly treated, is colorless or nearly so.

EXAMPLE 4

Copolymer of Acrylonitrile and Diallylmethylamine

A reaction vessel provided with a reflux condenser is charged with 180 g. (about 94.7 mole percent) of acrylonitrile, 20 g. (about 5.3 mole percent) of diallylmethylamine, 750 ml. of benzene, and 2 g. of alpha,alpha'-azodiisobutyronitrile (polymerization catalyst). This solution is refluxed on a steam bath for 2 hours. The resulting linear copolymer of acrylonitrile and diallylmethylamine is filtered off, washed with acetone and air-dried. The dried, amorphous copolymer is cream-colored and is completely soluble in dimethylformamide.

A portion of the copolymer is made into a fiber as described in Example 5.

EXAMPLE 5

Forty (40) parts of the binary polymer of Example 4 is slurried by rapid stirring at room temperature in 160 parts of dimethylformamide. While protected by a blanket of carbon dioxide the temperature of the mixture is raised to 80° C. with slow stirring until all of the copolymer has dissolved to form a clear, viscous solution.

After filtration and deaeration the warm solution is extruded downwardly through a spinnerette having 40 holes, each 70 microns in diameter, into a spinning cell, the inner wall of which is maintained at a temperature of approximately 425° C. by means of a fluid heating medium which circulates around the outer wall of the cell. A current of preheated gas at 125° C. is introduced at the bottom of the cell and passes upwardly countercurrent to the filaments which pass downwardly from the spinnerette. By this means the major proportion of the dimethylformamide is evaporated from the filaments by the time the filaments have reached the bottom of the cell.

From the bottom of the cell the group of filaments or thread is led through water to remove the last of the dimethylformamide solvent, after which it is continuously dried by passing it over a pair of heated drying rolls. The dry multifilament thread is then thermoplastically stretched by conducting it through a slot which is maintained at 400° C. and thence to stretch rolls. Stretch is applied to the thread by having the surface speed of the rolls on the delivery end of the heated slot 9 times that of the surface speed of the rolls which feed the thread to the slot. The filaments are oriented along the fiber axis by this stretching operation.

The thermoplastically stretched thread is more lustrous than that of the unstretched thread. To remove residual strains or shrinkage, the thread is conducted through a second, heated slot at 400° C. and thence to a pair of rolls, the surface speed of which is adjusted to permit about 15% shrinkage of the thread in the slot. After this thermoplastic treatment the thread is collected on a ring-twister bobbin.

A skein of the finished thread is tested for its dyeability, in comparison with a skein of thread similarly prepared from homopolymeric acrylonitrile, as follows:

Each skein (10 parts) is placed in a dye bath consisting of 500 parts of an aqueous solution containing 0.2 part of concentrated sulfuric acid, 1 part of sodium sulfate and 0.2 part of Calcocid Alizarine Blue SAPG (Color Index No. 1054). The dye bath is boiled for 30 minutes, after which the skeins are removed from the bath and washed with hot water until the water is free of dye. The skein of thread of homopolymeric acrylonitrile is substantially undyed while the skein of thread of the copolymer of Example 4 is dyed blue. Other properties of the thread of copolymer, such as wet and dry tenacities, elongation, abrasion resistance, etc., are substantially the same as those which characterize the thread of homopolymeric acrylonitrile.

EXAMPLE 6

*Copolymer of Acrylamide and Diallylbenzylamine*

A linear copolymer is prepared from a mixture of 98.5 mole percent of acrylamide and 1.5 mole percent of diallylbenzylamine in essentially the same manner as described under Example 2. The resulting copolymer solution is diluted to 11.1% solids. A viscosity measurement of the diluted solution is off the scale of the Brookfield viscosimeter on the high side, and thus is over 100,000 cps. The 11.1% solution is almost gelatinous while cold but fluid when heated. It is useful, for instance, in preventing sedimentation of finely divided materials, e.g., silver halides; in preparing compositions that can be employed as vehicles for the preparation of light-sensitive emulsions; or in applications where other soluble polyelectrolytes are commonly employed.

EXAMPLE 7

*Copolymer of Styrene and Diallylamine*

To 30 parts (about 39.2 mole percent) of diallylamine dissolved in 110 parts of water is added 14.3 parts of a 35% solution of stearamidopropyl-beta-hydroxyethylammonium chloride (wetting agent) and 200 parts of water. The solution is adjusted to pH 4.5 with dilute sodium hydroxide. This mixture is contained in a 3-necked flask equipped with a stirrer, three dropping funnels, a thermometer, a reflux condenser, and a gas-inlet tube. The system is swept with nitrogen for 1½ hours. Funnel I is charged with 1 part of ammonium persulfate and 50 parts of water. Funnel II is charged with ½ part of potassium meta-bisulfite and 50 parts of water. Funnel III is charged with 50 parts of styrene (about 60.8 mole percent). The contents of the three dropping funnels are added simultaneously and at equal rates over a 1-hour period with vigorous stirring. The pot temperature is maintained at 43° C. Stirring is continued for 2 additional hours at a temperature of 43° C., after which any unpolymerized styrene is removed by steam distillation. A free-flowing copolymer emulsion is obtained which exhibits exceptional stability. The emulsion of the linear copolymer of styrene and diallylamine is not broken by the addition of alum or sodium sulfate, by boiling, heating for 1 hour, or freezing in a Dry Ice bath for 2 hours. Upon evaporation to dryness and redissolution of the residue in water, the copolymer emulsion is again obtained.

The remarkable and unexpected stability of this emulsion makes it eminently suitable for use as a component of wall paints, adhesives, and coating and/or impregnating compositions. This copolymeric emulsion or latex also can be employed directly for the preparation of various sheets, coatings and elastomeric articles.

Instead of styrene employed in this example, one can use an equivalent amount of, for example, para-methyl styrene, alpha, para-dimethyl styrene, any of the nuclearly substituted dialkyl styrenes, the various chloro- and cyano-substituted styrenes, vinyl naphthalene and other compounds which are different from diallylamine, are copolymerizable therewith and contain a single $CH_2$=C< grouping.

EXAMPLE 8

*Copolymer of Methyl Acrylate and Diallylamine*

To 6.5 g. (about 37.2 mole percent) of diallylamine dissolved in 21 g. of water is added 9.7 g. (about 62.8 mole percent) of methyl acrylate, 300 g. of water, 0.2 g. of sodium chlorate, 1.4 g. of sodium sulfite heptahydrate, and the homogeneous solution is adjusted to pH2 by the addition of a few ml. of 3 N nitric acid. The solution is heated at 65° C. for 3 hours. A quantity of rubbery, water-insoluble linear copolymer of methyl acrylate and diallylamine forms during this time. It is filtered off, washed with water and dried to a constant weight. This copolymer can be used, for instance, as a component of various finishes and sizes (e.g., textile sizes, leather-finishing compositions, etc.), as a modifier of other synthetic resins, as a component of printing pastes, as an intermediate in producing other synthetic materials, and for other purposes.

Instead of methyl acrylate employed in this example, one can use an equivalent amount of any of the other alkyl acrylates and methacrylates, especially the lower alkyl acrylates and methacrylates, e.g., ethyl, propyl, butyl and amyl acrylates, and the methyl to amyl, inclusive, methacrylates; also, the corresponding alpha-chloroacrylates.

EXAMPLE 9

*Copolymer of Vinyl Acetate and Diallylmethylamine*

To 7.5 g. (about 37.4 mole percent) of diallylmethyl-amine dissolved in 22 g. of water is added 9.7 g. (about 62.6 mole percent) of vinyl acetate, 200 g. of water, 3.0 g. of a 35% solution of stearamidopropyl-beta-hydroxyethylammonium chloride (wetting agent), 0.5 g. of sodium lauryl sulfate, 0.2 g. of ammonium persulfate, 0.1 g. of potassium meta-bisulfite, and the mixture, after vigorous shaking, is adjusted to pH 2 with 3 N nitric acid. The cloudy emulsion is heated with occasional shaking for 3 hours at 65° C. On the following day it is noted that addition of the reaction mixture to water yields a quantity of a white, rubbery, water-insoluble, linear copolymer of vinyl acetate and diallylmethylamine. The copolymer is filtered off, washed with water and dried at room temperature to a constant weight. It can be used, for example, as an adhesive composition or as a component of such compositions.

Instead of vinyl acetate employed in this example, one can use an equivalent amount of, for example, vinyl propionate, butyrate, isobutyrate, or laurate.

EXAMPLE 10

*Preparation of Ternary Polymer of Acrylamide, Acrylic Acid and Diallylethylamine*

Into a three-necked reaction vessel equipped with two dropping funnels, thermometer, stirrer and an inlet for the introduction of nitrogen gas is charged a mixture of 1 part (about 3.7 mole percent) of diallylethylamine in 57 parts of water. The system is purged for 1 hour with prepurified nitrogen gas. One dropping funnel is charged with a mixture of 3 parts (about 19.6 mole percent) of acrylic acid and 11.6 parts (about 76.7 mole percent) of acrylamide which has been neutralized to a pH of 7 with a base, and 34 parts of water. Equal portions of the contents of each of the dropping funnels are added to the reaction vessel every 5 minutes over a period of ½ hour, at the end of which time the last addition has been made. The temperature of the reaction mass is maintained at 70°–80° C. throughout the reaction period. The flow of nitrogen gas through the system is continued during the entire reaction period. After the contents of the two dropping funnels has all been added to the reaction vessel, the reaction is permitted to continue for an additional 3½ hours. The resulting aqueous solution of a linear ternary polymer of acrylamide, acrylic acid and diallylethylamine is suitable for such uses as described under Examples 1, 2 and 6 with reference to the copolymers of those examples.

EXAMPLE 11

*Ternary Polymer of Acrylonitrile, Vinyl Acetate and Diallylamine*

A reaction vessel, provided with two dropping funnels, is charged with 93.0 g. (about 90.8 mole percent) of 96.9% acrylonitrile, 5.3 g. (about 3.3 mole percent) of vinyl acetate, 10.6 g. (about 5.9 mole percent) of diallylamine, 10.6 g. of sodium nitrate, 1200 ml. of deionized water, and 35 ml. of 3 N nitric acid. Funnel A is charged with 0.880 g. of sodium chlorate and 3.15 g. of sodium sulfite dissolved in 100 ml. of water. Funnel B is charged with 12 ml. of 3 N nitric acid in 88 ml. of water. The reaction vessel and its contents are purged with nitrogen gas for ½ hour before additions of catalysts are begun. The pot temperature is raised to 40° C. and held at that temperature throughout the polymerization. The contents of the funnels are added portionwise over a 2½-hour period followed by a 1½-hour heating period to insure completeness of reaction. The final pH is 2.2. The white, amorphous, linear, ternary polymer of acrylonitrile, vinyl acetate and diallylamine is filtered off, washed and oven-dried at 70° C. It weighs 76 g. (72% conversion). The molecular weight (Staudinger method) is about 72,500.

EXAMPLE 12

Sixty (60) g. of the linear ternary polymer of acrylonitrile, vinyl acetate and diallylamine of Example 11, 70 ml. of water and 470 g. of a 57.5% aqueous solution of sodium thiocyanate are mixed to dissolve the polymer and to form a spinning solution. This solution is filtered, placed under vacuum and allowed to deaerate for about 72 hours.

The aforementioned spinning solution is formed into fiber by extruding it through a spinnerette, having 40 holes each 90 microns in diameter, into a coagulating bath comprising water maintained at a temperature of about 0° C. The spun fiber in gel state is continuously passed over a pair of converging wash rolls while it is advancing in a helical path. The fiber is rinsed with water on the rolls to remove excess thiocyanate. The washed fiber is stretched about 600% while passing through a bath of hot water maintained at a temperature of about 99.5° C., and then is taken up on a bobbin where it is kept in a gelled state by applying a fine spray of water while the fiber is being collected on the bobbin. It can be air-dried, oven-dried (for instance, under controlled conditions of temperature and humidity), or dried by passing it in a helical path over a pair of heated, converging drying rolls.

A 5-gram swatch of the above-described fiber (Sample A) and a 5-gram swatch of a fiber similarly made from homopolymeric acrylonitrile (Sample B) are immersed in a dye bath consisting of 500 parts of an aqueous solution containing 0.2 part of concentrated sulfuric acid, 1 part of sodium sulfate and 0.2 part of Calcocid Alizarine Blue SAPG (Color Index No. 1054). The dye bath is boiled for 30 minutes, after which the swatches are removed and washed with hot water until the water is free of dye. The Sample A swatch is dyed a deep blue color while the Sample B swatch is undyed.

EXAMPLE 13

*Ternary Polymer of Acrylonitrile, Vinyl Acetate and Diallylmethylamine*

A reaction vessel as in Example 11 is charged with 93.0 g. (about 91.6 mole percent) of 96.9% acrylonitrile, 5.3 g. (about 3.3 mole percent) vinyl acetate, 10.6 g. (about 5.1 mole percent of diallylmethylamine, 10.6 g. of sodium nitrate, 30 ml. of 3 N nitric acid, and 950 ml. of deionized water. The resulting solution has a pH of 2.85. Funnel A is charged with 0.880 g. of sodium chlorate and 3.150 g. of sodium sulfite in 100 ml. of water. Funnel B is charged with 12 ml. of 3 N nitric acid in 88 ml. of water. The reaction vessel and its contents are purged with nitrogen gas for ½ hour before additions of catalysts are begun. The addition period and subsequent reaction period are as in Example 11. The polymerization temperature is maintained at 40° C. throughout. The white, amorphous, linear, ternary polymer of acrylonitrile, vinyl acetate and diallylmethylamine is filtered off, washed with water and dried in an oven at 70° C. It weighs 77 g., representing a yield of about 72.5% of the theoretical. The molecular weight (Staudinger method) is about 71,500.

EXAMPLE 14

The linear, ternary polymer of acrylonitrile, vinyl acetate and diallylmethylamine of Example 13 is made into a spinning solution and thence into a fiber in essentially the same manner described under Example 12 with the following exceptions: The washed thread is stretched about 700% while passing through the 99.5° C. stretch bath, and the thread is dried by passing it continuously in a helical path over a pair of electrically heated, converging drying rolls. Finally, it is thermally relaxed 15%. The filamentary material shows no shrinkage in boiling water, and the dyeing characteristics are essentially the same as those of the product of Example 12. Other properties are generally the same as those obtained by similarly spinning homopolymeric acrylonitrile; however, the ternary polymer used in this example gives a spinning solution that has better spinning characteristics than a similar solution of homopolymeric acrylonitrile.

In a manner similar to that described above with reference to the production of the copolymers of the individual examples, one can prepare linear copolymers of other compounds embraced by Formula I and a monoethylenically unsaturated compound which is copolymerizable therewith and which contains a single $CH_2=C<$ grouping using the ingredients in the molar percentage proportions hereinbefore described. For instance, one can prepare a copolymer of methyl isopropenyl ketone and diallylamine in a manner similar to that described under Example 8 with reference to the preparation of a copolymer of methyl acrylate and diallylamine, using a chemically equivalent amount of methyl isopropenyl ketone for the amount of methyl acrylate used in Example 8. Instead of methyl isopropenyl ketone one can use an equivalent of, for example, methyl, ethyl, propyl or isobutyl vinyl ketone, phenyl vinyl ketone or ethyl isopropenyl ketone; or any of the vinyl alkyl ethers, e.g., methyl, ethyl, isopropyl, n-butyl, isobutyl or 2-ethylhexyl vinyl ether.

We claim:

1. A composition comprising a linear copolymer obtained by solely addition polymerization of a mixture of copolymerizable ingredients including (1) a bis ethylenically unsaturated compound represented by the general formula

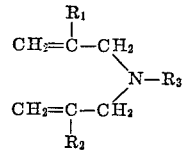

where $R_1$ and $R_2$ each represents a member of the class consisting of hydrogen and the methyl radical, and $R_3$ represents a member of the class consisting of hydrogen, saturated aliphatic hydrocarbon radicals and aromatic hydrocarbon radicals, and (2) a monoethylenically unsaturated compound which is represented by the general formula

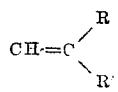

where R represents a member of the class consisting of hydrogen and alkyl, aryl, alkaryl and aralkyl radicals, and R' represents a radical of the class consisting of aryl and alkaryl radicals and radicals represented by the formulas (a) $\quad -C \equiv N$ (b) $\quad -O-\overset{O}{\underset{\|}{C}}-R_5$ (c) $\quad -\overset{O}{\underset{\|}{C}}-OR_6$ (d) $\quad -\overset{O}{\underset{\|}{C}}-R_7$ (e) $\quad -\overset{O}{\underset{\|}{C}}-N\overset{R_8}{\underset{R_9}{\diagdown}}$ (f) $\quad -OR_{10}$ where $R_5$ and $R_6$ each represent an alkyl radical, $R_7$ represents a radical selected from the class consisting of alkyl and aryl radicals, $R_8$ and $R_9$ each represent a member of the class consisting of hydrogen and alkyl, aryl, alkaryl and aralkyl radicals, and $R_{10}$ represents an alkyl radical, the ingredients of (1) and (2) being present in the aforementioned mixture in the ratio of from 0.1 to 40 molar percent of the former to from 99.9 to 60 molar percent of the latter.

2. A composition as in claim 1 wherein the bis ethylenically unsaturated compound of (1) is diallylamine.

3. A composition as in claim 1 wherein the bis ethylenically unsaturated compound of (1) is diallylmethylamine.

4. A composition as in claim 1 wherein the monoethylenically unsaturated compound of (2) is acrylonitrile.

5. A composition as in claim 1 wherein the monoethylenically unsaturated compound of (2) is acrylamide.

6. A composition as in claim 1 wherein the monoethylenically unsaturated compound of (2) is vinyl acetate.

7. A composition as in claim 1 wherein the monoethylenically unsaturated compound of (2) is styrene.

8. A product comprising an oriented fiber comprised of a linear copolymer obtained by solely addition polymerization of a mixture of copolymerizable ingredients including (1) a bis ethylenically unsaturated compound represented by the general formula

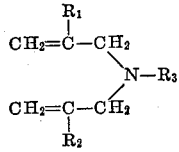

where $R_1$ and $R_2$ each represents a member of the class consisting of hydrogen and the methyl radical, and $R_3$ represents a member of the class consisting of hydrogen, saturated aliphatic hydrocarbon radicals and aromatic hydrocarbon radicals, and (2) acrylonitrile, the ingredients of (1) and (2) being present in the aforementioned mixture in the ratio of from 2 to 20 molar percent of the former to from 98 to 80 molar percent of the latter.

References Cited in the file of this patent

UNITED STATES PATENTS

| | | |
|---|---|---|
| 2,456,428 | Parker | Dec. 14, 1948 |
| 2,586,238 | Lytton | Feb. 19, 1952 |
| 2,700,027 | Bruson | Jan. 18, 1955 |
| 2,810,716 | Markus | Oct. 22, 1957 |
| 2,840,550 | Price | June 24, 1958 |
| 2,844,561 | Bechtold et al. | July 22, 1958 |
| 2,923,701 | Schuller et al. | Feb. 2, 1960 |
| 2,980,634 | Melamed | Apr. 18, 1961 |
| 2,980,657 | Melamed | Apr. 18, 1961 |

OTHER REFERENCES

Butler et al.: Journal Amer. Chem. Soc., vol. 76, pages 2418–2421 (May 1954).

"Ind. and Eng. Chemistry," Hurd et al., vol. 40, No. 11, November 1948, page 2081 relied on.